US006761443B2

(12) United States Patent
Jones

(10) Patent No.: US 6,761,443 B2
(45) Date of Patent: Jul. 13, 2004

(54) KEYING FEATURE FOR SOLID INK STICK

(75) Inventor: Brent R. Jones, Tualatin, OR (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 10/135,049

(22) Filed: Apr. 29, 2002

(65) Prior Publication Data

US 2003/0202065 A1 Oct. 30, 2003

(51) Int. Cl.[7] .............................. B41J 2/175; B41J 2/17; G01D 11/00

(52) U.S. Cl. .............................. 347/88; 347/99; 347/84; 347/85; 347/95

(58) Field of Search .............................. 347/88, 99

(56) References Cited

U.S. PATENT DOCUMENTS

| | | | | | |
|---|---|---|---|---|---|
| 5,038,157 | A | | 8/1991 | Howard | 346/140 R |
| 5,442,387 | A | | 8/1995 | Loofbourow et al. | 347/88 |
| 5,455,604 | A | | 10/1995 | Adams et al. | 346/138 |
| 5,510,821 | A | | 4/1996 | Jones et al. | 347/88 |
| 5,734,402 | A | | 3/1998 | Rousseau et al. | 347/88 |
| 5,805,191 | A | | 9/1998 | Jones et al. | 347/103 |
| 5,861,903 | A | | 1/1999 | Crawford et al. | 347/88 |
| D409,237 | S | * | 5/1999 | Ellers et al. | 191/4 |
| D412,527 | S | * | 8/1999 | Ellers et al. | 474/49 |
| D412,528 | S | * | 8/1999 | Ellers et al. | 105/49 |
| 5,975,690 | A | * | 11/1999 | Grellmann et al. | 347/88 |
| 5,988,805 | A | | 11/1999 | Meinhardt | 347/88 |
| 6,053,608 | A | * | 4/2000 | Ishii et al. | 347/88 |
| D436,124 | S | * | 1/2001 | Mattern et al. | 210/539 |

OTHER PUBLICATIONS

Jones et al., "Alignment Feature For Solid Ink Stick," U.S. patent application Ser. No. XX/XXX,XXX (Attorney Docket No. D/A 1673), filed concurrently herewith.

Summary of Tektronix/Xerox Corporation Solid Ink Stick Products sold at least one year prior to Apr. 29, 2002.

* cited by examiner

*Primary Examiner*—Lamson Nguyen
*Assistant Examiner*—Leonard Liang
(74) *Attorney, Agent, or Firm*—David J. Arthur

(57) ABSTRACT

A set of ink sticks for a phase change ink jet printer includes a plurality of ink sticks. Each ink stick is formed of a three dimensional ink stick body with a perimeter. Each of the ink stick bodies has one or more key elements formed in its perimeter. Each of the key elements has a uniform shape and size. The key elements are in different positions on the perimeter of each ink stick, and particularly the key elements of some of the ink sticks are on a different side of the ink stick than are the key elements on others of the ink sticks in the set. Corresponding keys on the openings through which the ink sticks are inserted into their appropriate feed channel exclude ink sticks of the set that do not have the appropriate perimeter key element.

17 Claims, 9 Drawing Sheets

KEYING FEATURE FOR SOLID INK STICK

CROSS-REFERENCE TO RELATED APPLICATION

Reference is made to commonly-assigned copending U.S. patent application Ser. No. 10/135089, filed Apr. 29, 2002, entitled "Alignment Feature for Solid Ink Stick," by Jones et al., the disclosure of which is incorporated herein.

The present invention relates generally to ink printers, the ink used in such ink printers, and the apparatus and method for feeding the ink into the printer.

BACKGROUND

Solid ink or phase change ink printers conventionally receive ink in a solid form, either as pellets or as ink sticks. A feed mechanism delivers the solid ink to a heater assembly, where the ink is melted into a liquid state for jetting onto a receiving medium.

Solid ink or phase change ink printers conventionally receive ink in a solid form and convert the ink to a liquid form for jetting onto a receiving medium. The printer receives the solid ink either as pellets or as ink sticks in a feed chute. With solid ink sticks, the solid ink sticks are either gravity fed or spring loaded through a feed channel of the feed chute toward a heater plate. The heater plate melts the solid ink into its liquid form. In a printer that receives solid ink sticks, the sticks are either gravity fed or spring loaded into a feed channel and pressed against a heater plate to melt the solid ink into its liquid form. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

SUMMARY

A set of ink sticks for a phase change ink jet printer includes a plurality of ink sticks. Each ink stick is formed of a three dimensional ink stick body with a perimeter. Each of the ink stick bodies has one or more key elements formed in its perimeter. Each of the key elements has a uniform shape and size. The key elements are in different positions on the perimeter of each ink stick, and particularly the key elements of some of the ink sticks are on a different side of the ink stick than are the key elements on others of the ink sticks in the set. Corresponding keys on the perimeters of the openings through which the ink sticks are inserted into their appropriate feed channel exclude ink sticks of the set that do not have the appropriate perimeter key element.

THE DRAWINGS

DETAILED DESCRIPTION

Figure 1:
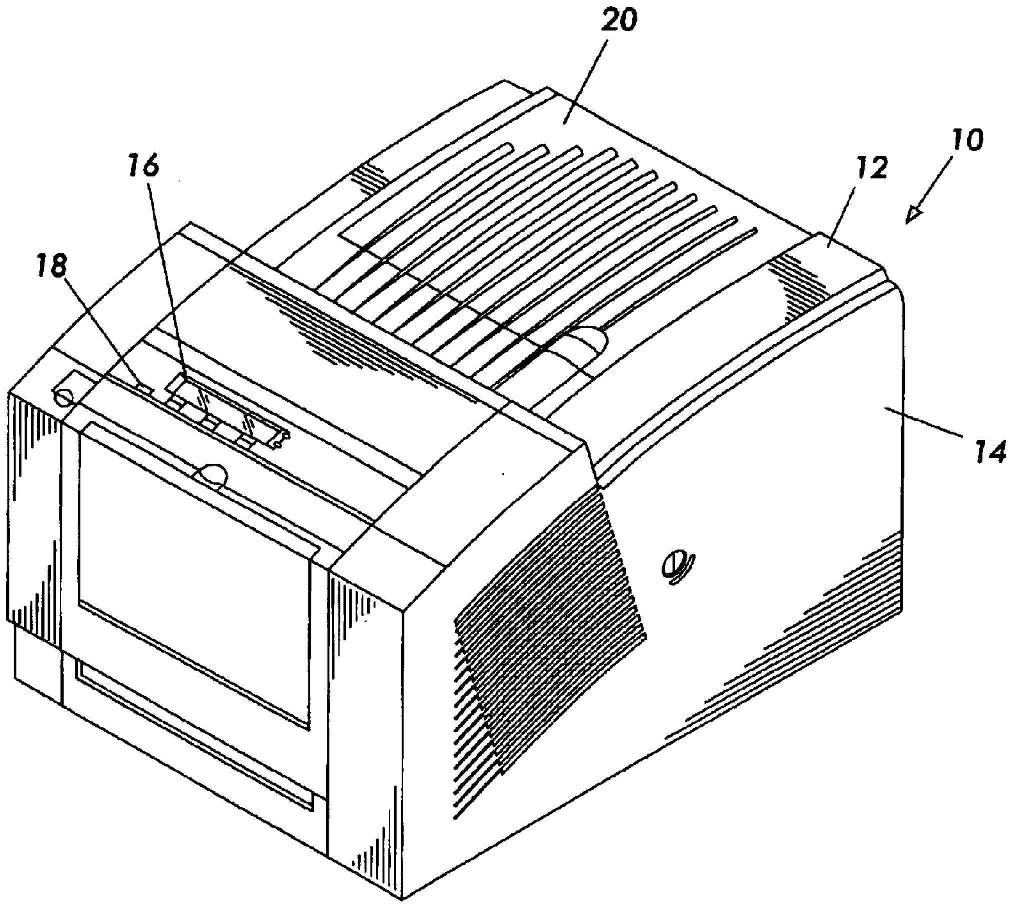
FIG. 1 is a perspective view of a phase change printer with the printer top cover closed.

Referring first to FIG. 1, a solid ink, or phase change ink printer 10 includes an outer housing having a top surface 12 and side surfaces 14. A user interface, such as a front panel display screen 16 displays information concerning the status of the printer, and user instructions. Buttons 18 or other control elements may be adjacent the user interface window, or at other locations on the printer, to permit user interaction with the printer. The printing mechanism (not shown) is contained inside the housing. An example of the printing mechanism is described in U.S. Pat. No. 5,805,191, entitled Surface Application System, to Jones et al., and U.S. Pat. No. 5,455,604, entitled Ink Jet Printer Architecture and Method, to Adams et al. An ink feed system delivers solid ink to the printing mechanism. The ink feed system may be contained under the top surface of the housing. The top surface of the housing includes a hinged top cover 20 that opens to reveal the ink feed system, and shown in FIG. 2.

Figure 2:
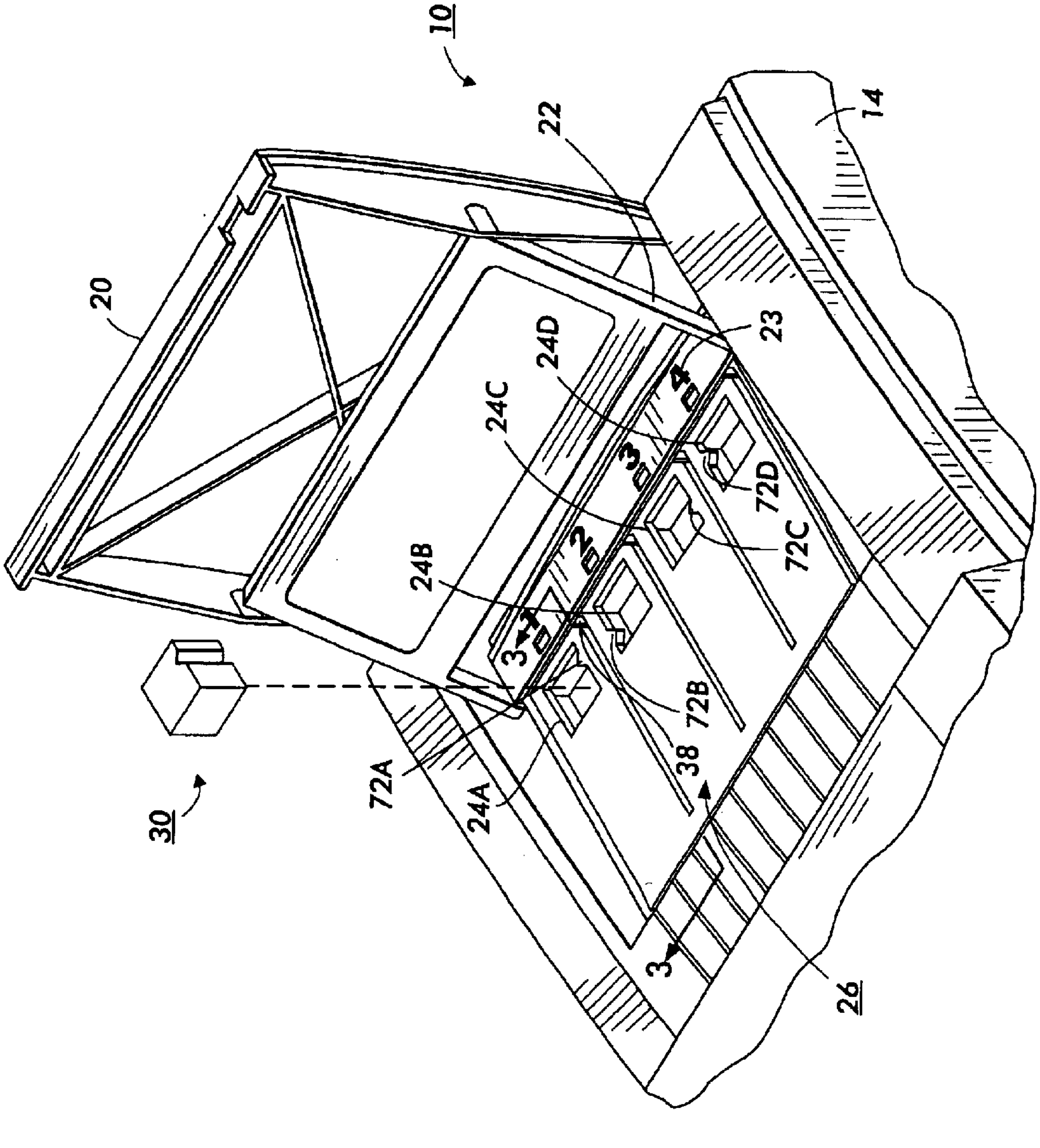
FIG. 2 is an enlarged partial top perspective view of the phase change printer with the ink access cover open, showing a solid ink stick in position to be loaded into a feed channel.
Figure 3:
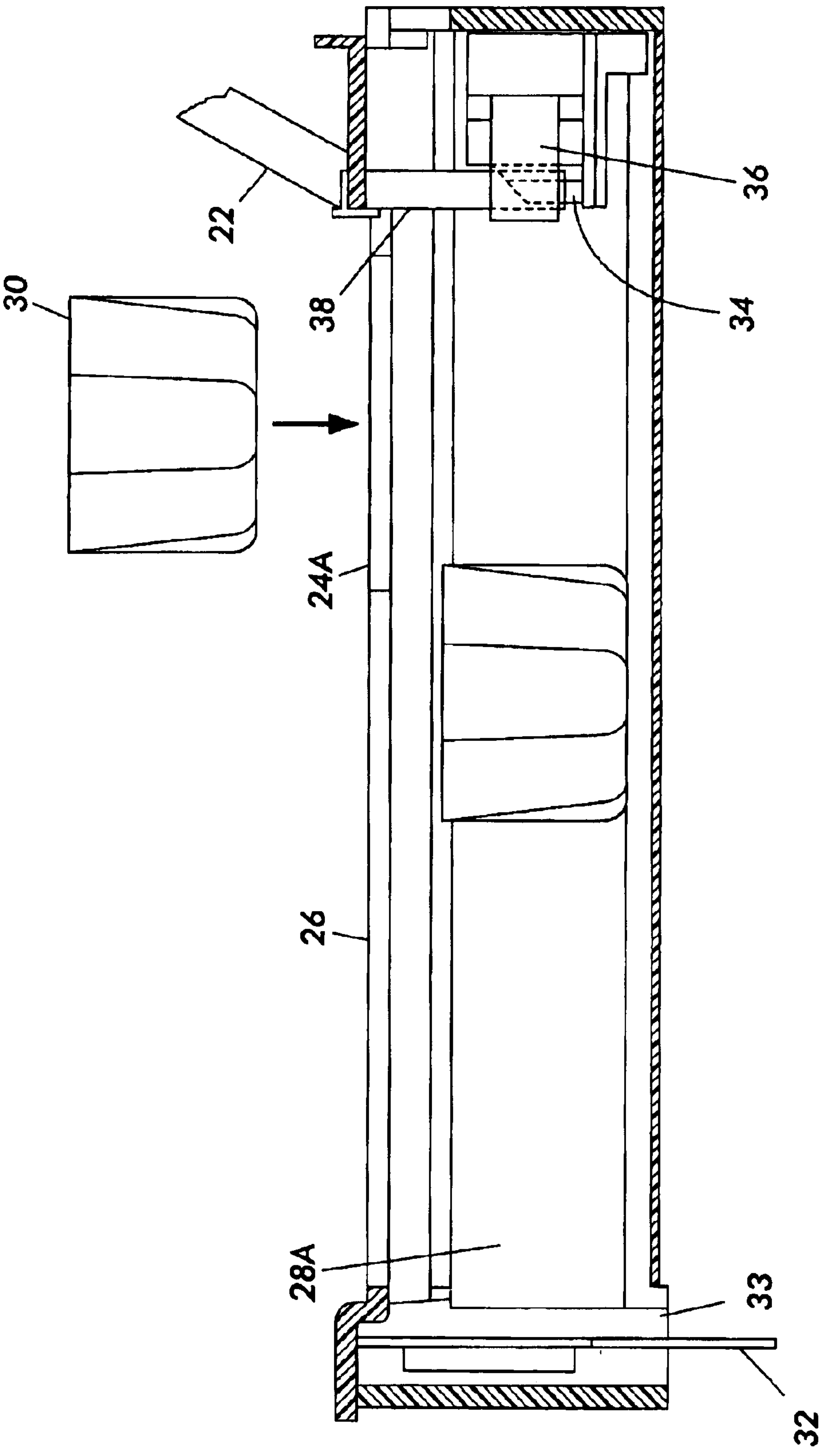
FIG. 3 is a side sectional view of a feed channel of a solid ink feed system, taken along line 3—3 of FIG. 2.

In the particular printer shown, the ink access cover 20 is attached to an ink load linkage element 22 so that when the printer ink access cover 20 is raised, the ink load linkage 22 slides and pivots to an ink load position. The interaction of the ink access cover and the ink load linkage element is described in U.S. Pat. No. 5,861,903 for an Ink Feed System, issued Jan. 19, 1999 to Crawford et al., though with some differences noted below. As seen in FIG. 2, opening the ink access cover 20 reveals a key plate 26 having keyed openings 24. Each keyed opening 24A, 24B, 24C, 24D provides access to an insertion end of one of several individual feed channels 28A, 28B, 28C, 28D of the solid ink feed system (see FIGS. 2 and 3).

Each longitudinal feed channel 28 delivers ink sticks 30 of one particular color to a corresponding melt plate 32. Each feed channel has a longitudinal feed direction from the insertion end of the feed channel to the melt end of the feed channel. The melt end of the feed channel is adjacent the melt plate. The melt plate melts the solid ink stick into a liquid form. The melted ink drips through a gap 33 between the melt end of the feed channel and the melt plate, and into a liquid ink reservoir (not shown). The feed channels 28 have a longitudinal dimension from the insertion end to the melt end, and a lateral dimension, substantially perpendicular to the longitudinal dimension. Each feed channel in the particular embodiment illustrated includes a push block 34 driven by a driving force or element, such as a constant force spring 36, to push the individual ink sticks along the length of the longitudinal feed channel toward the melt plates 32 that are at the melt end of each feed channel. The tension of the constant force spring 36 drives the push block toward the melt end of the feed channel. In a manner similar to that described in U.S. Pat. No. 5,861,903, the ink load linkage 22 is coupled to a yoke 38, which is attached to the constant force spring 36 mounted in the push block 34. The attachment to the ink load linkage 22 pulls the push block 34 toward the insertion end of the feed channel when the ink access cover is raised to reveal the key plate 26. The constant force spring 36 can be a flat spring with its face oriented along a substantially vertical axis.

Figure 4:
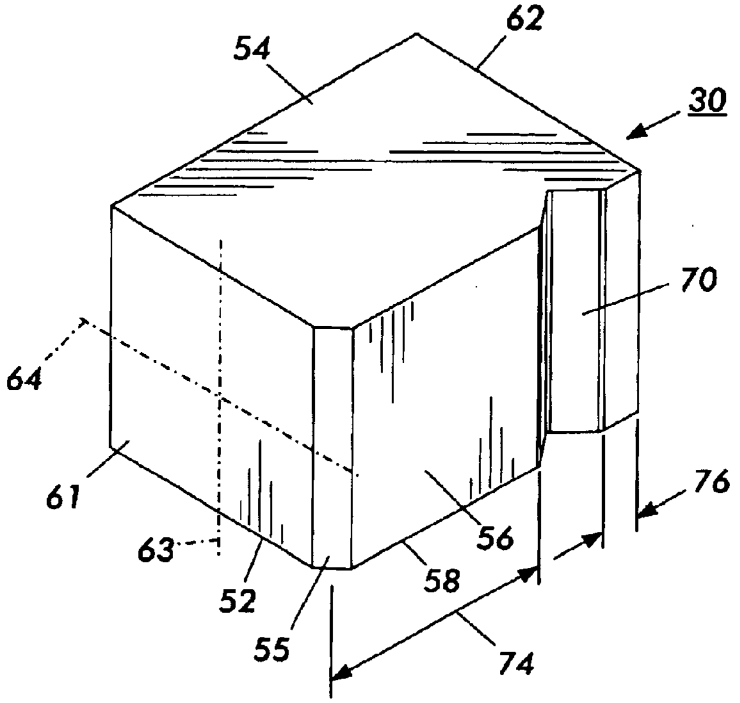
FIG. 4 is a perspective view of an embodiment of a solid ink stick.

An exemplary solid ink stick 30 for use in the feed system is illustrated in FIG. 4. The ink stick is formed of a three dimensional ink stick body. A substantially cubic ink stick body is illustrated in FIG. 4. The ink stick body illustrated has a bottom surface 52 and a top surface 54 that are substantially parallel to one another. The ink stick body also has a plurality of side surfaces 56, 61, 62. The illustrated embodiment includes four side surfaces, including two end surfaces 61, 62 and two lateral side surfaces 56. The lateral side surfaces 56 are substantially parallel one another, and are substantially perpendicular to the top and bottom surfaces 52, 54. The end surfaces 61, 62 are also substantially parallel one another, and substantially perpendicular to the top and bottom surfaces, and to the lateral side surfaces. The surfaces of the ink stick body need not be flat, nor need they be parallel or perpendicular to one another. However, these descriptions will aid the reader in visualizing, even though the surfaces may have three dimensional topography, or be angled with respect to one another. The ink stick is configured to fit into the feed channel of the feed channel with the two lateral side surfaces 56 of the ink stick body oriented along the longitudinal feed direction of the feed channel. With the substantially cubic ink stick shape illustrated, the end surfaces are thus oriented along the transverse or lateral dimension of the feed channel. One of the end surfaces 61 is a front or leading end surface, and the other end surface 62 is a rear or trailing end surface. The bottom surface has lateral edges 58 at which the bottom surface 52 intersects the lateral side surfaces 56. The ink stick body may be formed by pour molding, injection molding, compression molding, or other known techniques.

Figure 5:
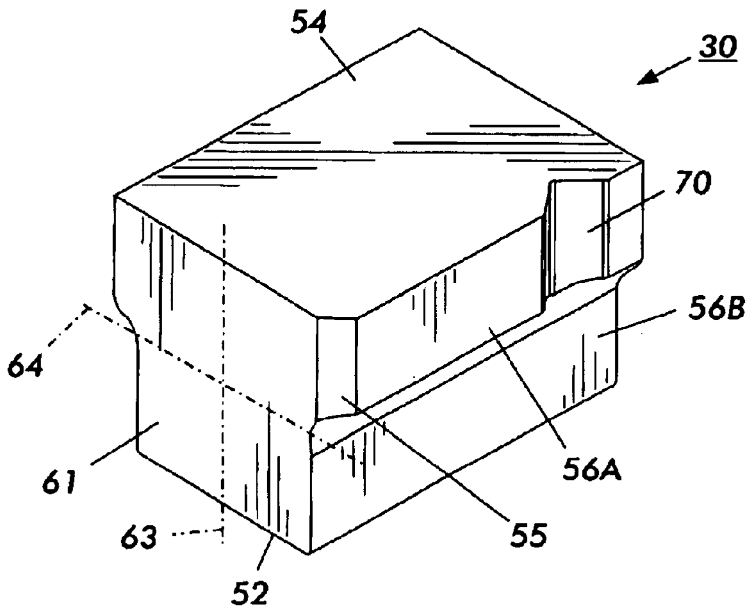
FIG. 5 is a perspective view of another embodiment of a solid ink stick.

The ink stick body can also be formed in any of numerous other shapes. FIG. 5 illustrates an embodiment of the ink stick body in which the lateral side surfaces 56 are stepped or segmented. In the particular embodiment illustrated, the lower portion of the body adjacent the bottom surface is narrower in the lateral dimension than the upper portion of the ink stick body adjacent the top surface. The lower portion of the ink stick body in the embodiment of FIG. 5 is approximately 5–30% narrower than the upper portion of the ink stick body.

The ink stick body has a lateral center of gravity 63 between the lateral side surfaces of the body, and a vertical center of gravity 64 between the top and bottom surfaces. If the ink stick body has a substantially uniform weight density, the lateral center of gravity is approximately midway between the lateral side surfaces 56 of the ink stick body.

The outermost lateral dimension of the ink stick body is only fractionally smaller than the lateral dimension of the ink stick feed channel 28.

For example, the ink stick body has a longitudinal dimension between the end surfaces 61, 62 (not including protruding insertion key or orientation elements) of between approximately 1.1 and 1.8 inches (28–46 mm), such as 1.5 inches (37 mm). The ink stick body may have a lateral dimension (not including protruding insertion key or orientation elements) between the lateral side surfaces 56 of between approximately 1.0 and 1.3 inches (25–33 mm), such as 1.3 inches (33 mm). The ink stick body may have a vertical dimension between the bottom and top surfaces 52, 54 of between approximately 1.0 and 1.5 inches (25–38 mm), such as 1.25 inches (32 mm). The lateral dimension of the ink stick feed channel 28 between the side walls 42, 44 may be approximately 0.004 to 0.08 inches (0.1–2.0 mm) wider than the lateral dimension of the ink stick body.

The ink stick body has an outer perimeter, as viewed from above the top of the ink stick body, that is substantially horizontal around the largest horizontal cross section of the ink stick body. In the ink stick embodiment illustrated in FIG. 4 in which the side surfaces are substantially vertical, the outer perimeter is substantially uniform from the bottom surface to the top surface of the ink stick body. In the ink stick embodiment illustrated in FIG. 5, the horizontal outer perimeter substantially corresponds with the top surface 54 of the ink stick body. The outermost lateral side portions 56A of the ink stick body form longitudinal ink stick body perimeter segments that extend substantially parallel with the longitudinal feed direction of the feed channel when the ink stick is inserted into the feed channel. After considering the present disclosure, those skilled in the art will recognize that the outermost longitudinal segments of the perimeter can be in different positions along the height of the ink stick body. The perimeter longitudinal segment on one of the lateral side surfaces can even be at a different height than the perimeter longitudinal segment on the other lateral side surface.

The ink sticks shown in FIGS. 4 and 5 have a substantially horizontal cross-sectional shape corresponding to the shape of the keyed opening 24 of the corresponding feed channel for that particular color. The ink stick body includes a key element 70 of a particular predetermined size, shape, and location on the outer perimeter of the ink stick body. In the particular examples illustrated, the ink stick key element 70 is formed in the longitudinal perimeter segment formed by the outermost portion of the lateral side surface. For an ink stick of a particular color, the ink stick key element 70 matches a complementary key 72A, 72B, 72C, 720 formed in the perimeter of the keyed opening 24 in the key plate. Each color for a printer has a unique arrangement of one or more key elements in the outer perimeter of the ink stick to form a unique cross-sectional shape for that particular color ink stick. The combination of the keyed openings 24 in the key plate 26 and the keyed shapes of the ink sticks 30 (formed by the key elements 70) insure that only ink sticks of the proper color are inserted into each feed channel. A set of ink sticks is formed of an ink stick of each color, with a unique key arrangement for ink sticks of each color.

In the ink stick embodiments shown in FIGS. 4 and 5, the key element 70 is a vertical recess or notch formed in one of the lateral side surfaces 56 of the ink stick body. The corresponding complementary key 72 on the perimeter of the keyed opening 24 is a complementary protrusion into the opening. An inwardly directed key element, such as a notch, in the ink stick body provides improved ability to exclude incorrect ink sticks. Only an ink stick with a recess of that particular location, shape, and size (or larger) will fit through the keyed opening in the key plate having a key consisting of a corresponding protrusion from the edge of the keyed opening. In addition, a recessed key element on the ink stick body allows much of the lateral side surfaces 56 of the ink stick body to be substantially flat. The key element extends at least approximately 0.16 inch (4 mm) into the ink stick body.

In the embodiment illustrated in FIG. 4, with a substantially flat lateral side surface extending from the bottom surface to the top surface, the key element 70 extends along the entire height of the lateral surface. The ink stick can pass through the keyed opening having a protrusion at a corresponding position of the keyed opening. The embodiment of FIG. 5 has the key element extend only along the portion of the lateral side surface 56A of the wider portion of the ink stick. In this embodiment, the corresponding key 72 on the keyed opening 24 of the key plate 26 does not extend far enough into the opening to require that the key element 70 be included in the narrower portion of the ink stick body.

The key element 70 on the ink stick body has a particular position with respect to the other perimeter segment of the ink stick body. For example, the key element has a particular spatial relationship with respect to the edges at which the perimeter segment containing the key element intersects other perimeter segments of the ink stick body. In further particularity, the key element 70 on the side surface 56 has a particular position with other surfaces of the ink stick body, such as the end surfaces 61, 62. The ink stick key element is located a leading distance 74 from the leading end surface 61 of the ink stick body, and a trailing distance 76 from the trailing end surface 62 of the ink stick body. In the embodiments illustrated in FIGS. 4 and 5, the leading distance 74 is substantially greater than the trailing distance 76. For example, the leading distance may be three times the trailing distance.

Figure 6:
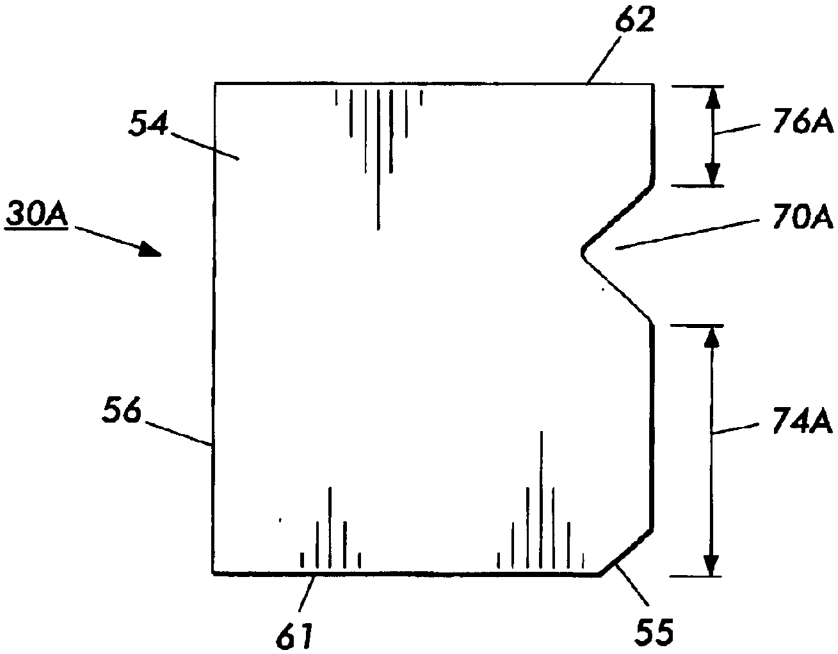
FIG. 6 is a top elevational view of the solid ink stick of FIG. 4.
Figure 7:
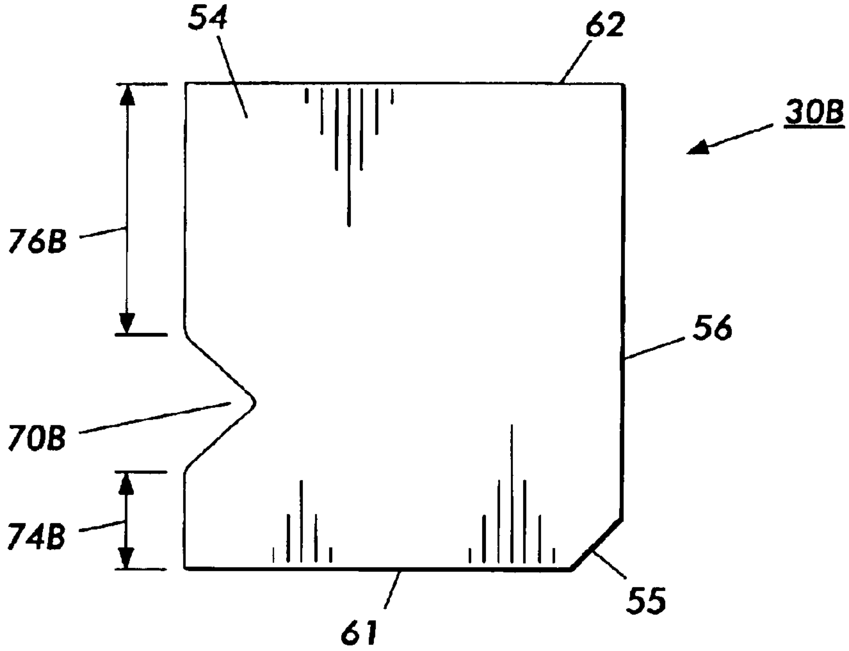
FIG. 7 is a top elevational view of another solid ink stick.
Figure 8:
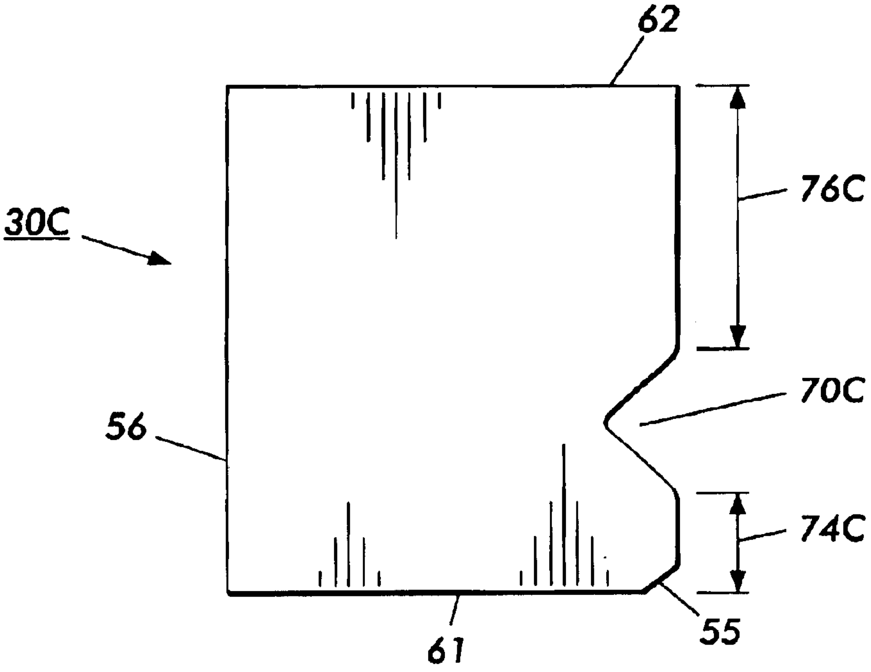
FIG. 8 is a top elevational view of another solid ink stick.
Figure 9:
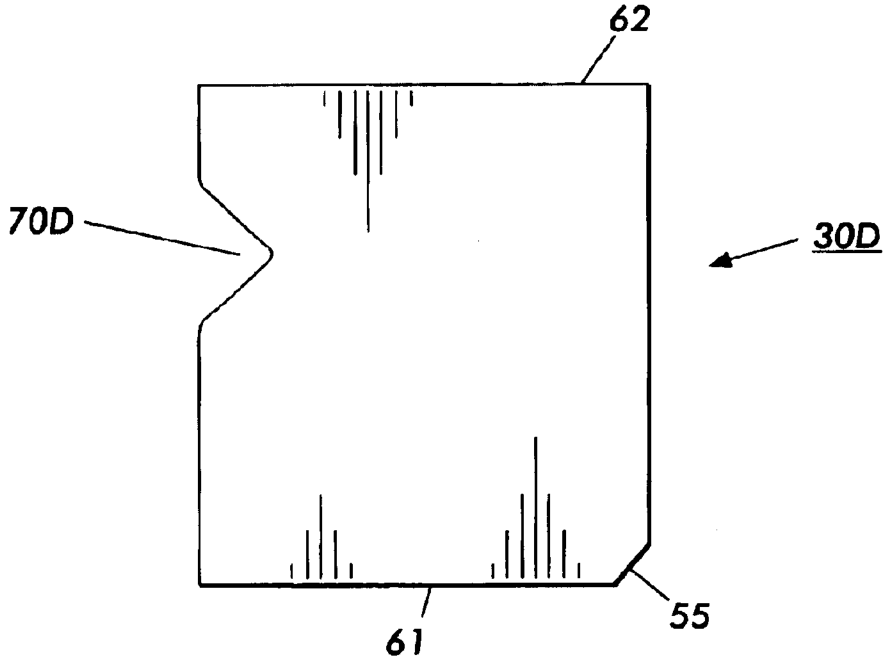
FIG. 9 is a top elevational view of another solid ink stick.

FIG. 6 is a top view of the ink stick of FIG. 4. A top view of the ink stick of FIG. 5 is identical. FIGS. 7, 8, and 9 are top views of ink sticks that may be included in a multi-color set of ink sticks for use in the printer shown in FIGS. 1–3. As can be seen by comparing ink stick shapes of FIGS. 6, 7, 8, and 9 with the keyed openings 24 of the key plate visible in FIG. 2, a set of ink sticks provides a unique one-to-one match between a particular color ink stick and the keyed openings providing access to the four ink stick feed channels 28. Such one-to-one match is provided by including a key element 70 of a single predetermined size and shape at different locations around the outer perimeter of the ink stick body. For example, an ink stick with the key element 70A positioned as shown in FIG. 6 can be inserted into the first keyed opening 24A in the key plate shown in FIG. 2, but cannot be inserted into any of the other keyed openings 24B, 24C, 24D. The keys 72B, 72C, 72D in the keyed openings 24B, 24C, 24D of the key plate and corresponding to the key element positions shown in the ink sticks 30B, 30C, 30D of FIGS. 7, 8, and 9 will block the ink stick 30A of FIG. 6. The ink stick 30B having the key element 70B positioned as shown in FIG. 7 can be inserted into the second keyed opening 24B of the key plate shown in FIG. 2, but not into the other keyed openings 24A, 24C, 24D. The ink sticks having the key elements 70C, 70D positioned as shown in FIGS. 8 and 9 (respectively) can be inserted into and only into the third and fourth key openings 24C, 24D, which correspond to the third and fourth ink stick feed channels. Thus, the key elements 70A, 70B, 70C, 70D provide discrimination among the different feed channels to stop the user from inserting an ink stick into the incorrect ink stick feed channel.

The key elements 70A, 70B, 70C, 70D are of substantially the same size and shape as one another, but are in different positions around the perimeter of the ink stick body. The key element 70C in the third ink stick 30C is formed in the same lateral side surface 56 as the key element 70A in the first ink stick 30A. But, the leading distance 74C from the leading end surface 61 to the key element 70C of the third ink stick 30C is significantly greater than the trailing distance 76C from the key element 70C to the trailing end surface 62. For example, the ratio of the leading distance 74C to trailing distance 76C for the third ink stick 30C could be the inverse of the ratio of the leading distance 74A to trailing distance 76A for the first ink stick 30A. More than one key element 70 can be included on a side surface 56 of the ink stick body. In particular, at least some of the key elements are on different sides of the ink stick horizontal perimeter. Thus, the key element 70A of the first ink stick is on a first section of the perimeter, while the key element 70B of the second ink stick is on a second section of the perimeter. The first and second sections of the perimeter do not correspond or align with one another when the first and second ink sticks 30A, 30B are aligned with one another.

An orientation feature 55 in each ink stick is useful to prevent erroneous ink insertion when the key element patterns (size and position) are symmetrical. The orientation feature illustrated is a corner notch in each ink stick. Referring to FIGS. 6 and 7, the orientation feature prohibits incorrect insertion of the first ink stick 30A into the second keyed opening 24B if the leading distance 74A and trailing distance 76A of the first ink stick are the same as the trailing distance 76B and leading distance 74B of the second ink stick. Those skilled in the art will identify numerous other types and configurations of features to ensure that ink sticks are inserted into the key opening with the correct orientation. For example, the orientation feature can be provided by positioning the key elements 70 so that the leading and trailing distances on different ones of the ink sticks are not symmetrical. Referring to the ink sticks shown in FIGS. 6 and 7, the orientation feature can be provided by having the leading distance 74A of the first ink stick 30A a different length than the trailing distance 76B of the second ink stick 30B and the trailing distance 76A of the first ink stick 30A a different length than the leading distance 74B of the second ink stick 30B.

In an alternative, the orientation feature can be provided by a nesting feature in which a protruding element from the leading end surface 61 of one ink stick nests with a recessed element in the trailing end surface 62 of an adjacent ink stick, as described in U.S. patent application Ser. No. 10/135,089, entitled Ink Stick with Alignment Feature, filed Apr. 29, 2002 by inventors Brent R. Jones, et al., the contents of which are hereby incorporated by reference.

The common shape and size of the key elements for the ink sticks of a particular set of ink sticks for a printer facilitates manufacture of the ink sticks, and enhances the "family" appearance of the set of ink sticks for that particular printer model. Different shapes and/or sizes of key elements can be used to differentiate ink sticks intended for different models of printers. For example, one printer could use triangular ink stick key elements 70. A different printer model could use semicircular ink stick key elements (not shown). Yet a different printer model could use rectangular ink stick key elements (not shown). The ink stick key elements need not all be formed in the longitudinal perimeter segments formed on the lateral side surfaces of the ink stick body. Key elements can also be formed in perimeter segments of the ink stick body that are at least partially transverse longitudinal feed direction. For example, key elements can be formed in the perimeter segments formed by the outermost portions of the end surfaces 61, 62 of the ink stick body.

The ink stick body can have a number of sides other than four. For example, the ink stick body can be formed with three, five, or virtually any number of side surfaces. These side surfaces need not be equal in length, nor is the ink stick body necessarily symmetrical about the lateral or vertical centers of gravity In other shapes, the ink stick body can have surfaces that are curved. For example, the ink stick body can have a cylindrical shape, with the axis of the cylinder parallel the longitudinal feed direction of the feed channel 28, parallel the lateral dimension of the feed channel 28, or perpendicular to both the longitudinal feed direction and the lateral dimension (vertical).

The ink stick body can also be formed in shapes other than a cubic rectangle. For example, the ink stick can have an elliptical horizontal cross sectional shape, a shape having multiple straight linear sides, or even a combination of curved and linear sides.

Figure 10:
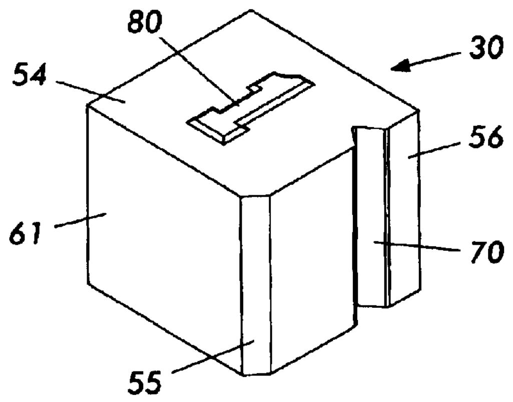
FIG. 10 is a perspective view of another embodiment of a solid ink stick.
Figure 11:
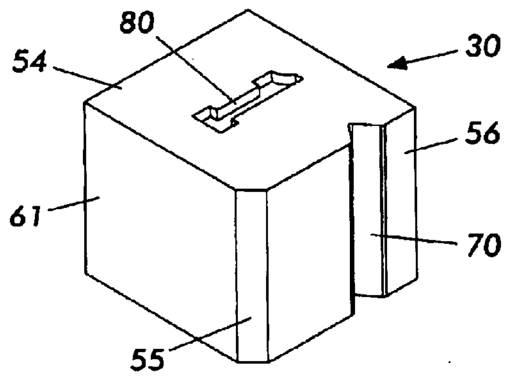
FIG. 11 is a perspective view of another embodiment of a solid ink stick.
Figure 12:
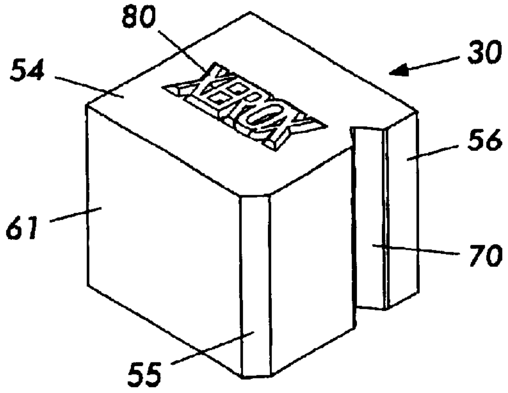
FIG. 12 is a perspective view of another embodiment of a solid ink stick.
Figure 13:
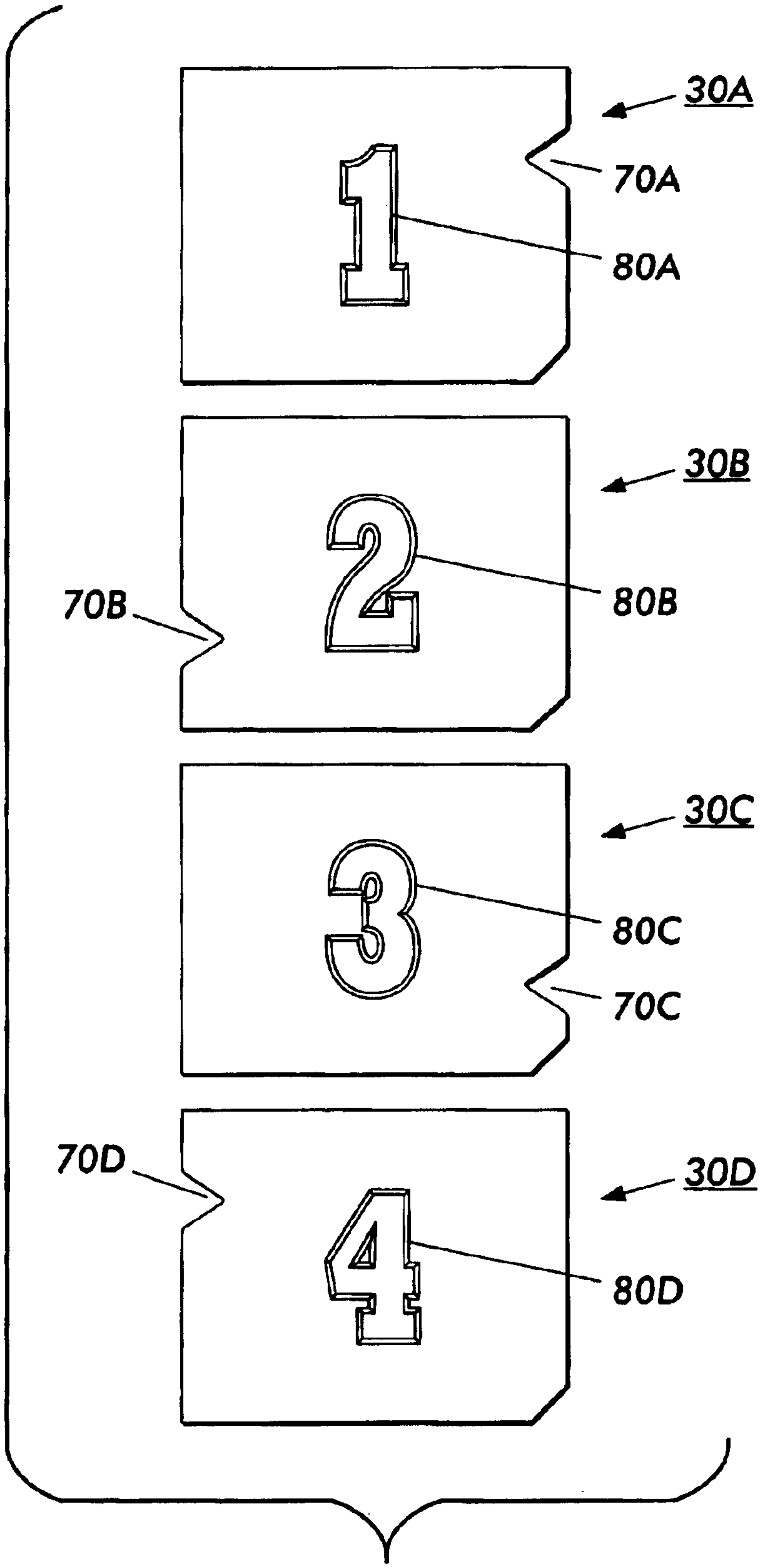
FIG. 13 is a top elevational view of a set of solid ink sticks.

An additional feature that reduces the possibility of incorrectly inserting an ink stick of one color into the feed channel intended for a different color is to include a visually recognizable symbol or mark 80 on the substantially horizontal top surface 54 of the ink block, as shown in FIGS. 10, 11, and 12. A visually recognizable symbol is a mark that conveys meaning to, or is easily recognizable by, a printer user. For maximum visibility, the visually recognizable symbol 80 is formed on the surface of the ink stick body with a vertical dimension, so that it is seen as three dimensional to the user. For example, the symbol 80 can be raised or embossed on the top surface, as shown in FIG. 10. The symbol could alternatively be impressed or debossed into the horizontal top surface of the ink stick block, as shown in FIG. 11. Referring to FIG. 13, a set of ink sticks for the printer shown in FIGS. 1–3 has the ink stick of the appropriate color identified with an alphanumeric character 80A, 80B, 80C, 80D corresponding to the particular keyed opening 24A, 24B, 24C, 24D leading to the appropriate feed channel 28 for that particular color of ink. The visually recognizable symbol 80 on the ink stick can match the visually recognizable symbol 23 adjacent the corresponding keyed opening. An ink stick 30A with a key element 70A as shown in FIG. 6 for fitting through the first keyed opening 24A of the key plate is marked with, for example, the visually recognizable numeral "1." An ink stick 30B with a key element 70B as shown in FIG. 7 for fitting through the second keyed opening 24B of the key plate is marked with the visually recognizable numeral "2." Ink sticks 30C, 30D with key elements 70C, 70D as shown in FIGS. 8 and 9 for fitting through the third and fourth keyed openings 24C, 24D of the key plate are marked with the visually recognizable numerals "3" and "4" respectively. Alternatively, the three dimensional visually recognizable symbol 80 could be a letter indicating the color of the ink stick (i.e., "C" for cyan, "M" for magenta, "Y" for yellow, and "K" for black). Other symbols that convey meaning or can be matched with symbols can be used. For distinguishing among feed channels (and their corresponding keyed openings), in some instances only a portion of the symbol need differ between ink sticks of an ink stick set. The visually recognizable symbol 80 can be formed on any of the surfaces of the ink stick body. If the visually recognizable symbol is formed on the top surface 54 of the ink stick body, the symbol aids the user in orienting the ink stick for insertion, and the symbol remains visible to the printer user as the user inserts the ink stick through the opening 24 of the key plate 26.

FIG. 12 shows that additional information besides the identification of the correct ink stick keyed opening can be provided on one or more of the surfaces of the ink stick body. An example is shown in which the visually recognizable symbol or mark 80 comprises the brand name of the ink sticks, which is formed in the substantially horizontal upper surface of the ink stick body. Visually recognizable characters are either embossed or debossed in the ink stick body surface to provide a three dimensional presentation of information. Visually recognizable symbols that convey meaning, such as alphanumeric characters, can provide a variety of information, such as the printer model for which the ink sticks are intended, or additional color information. Such symbols reduce the likelihood of a printer user inserting ink sticks into the incorrect model printer.

Figure 14:
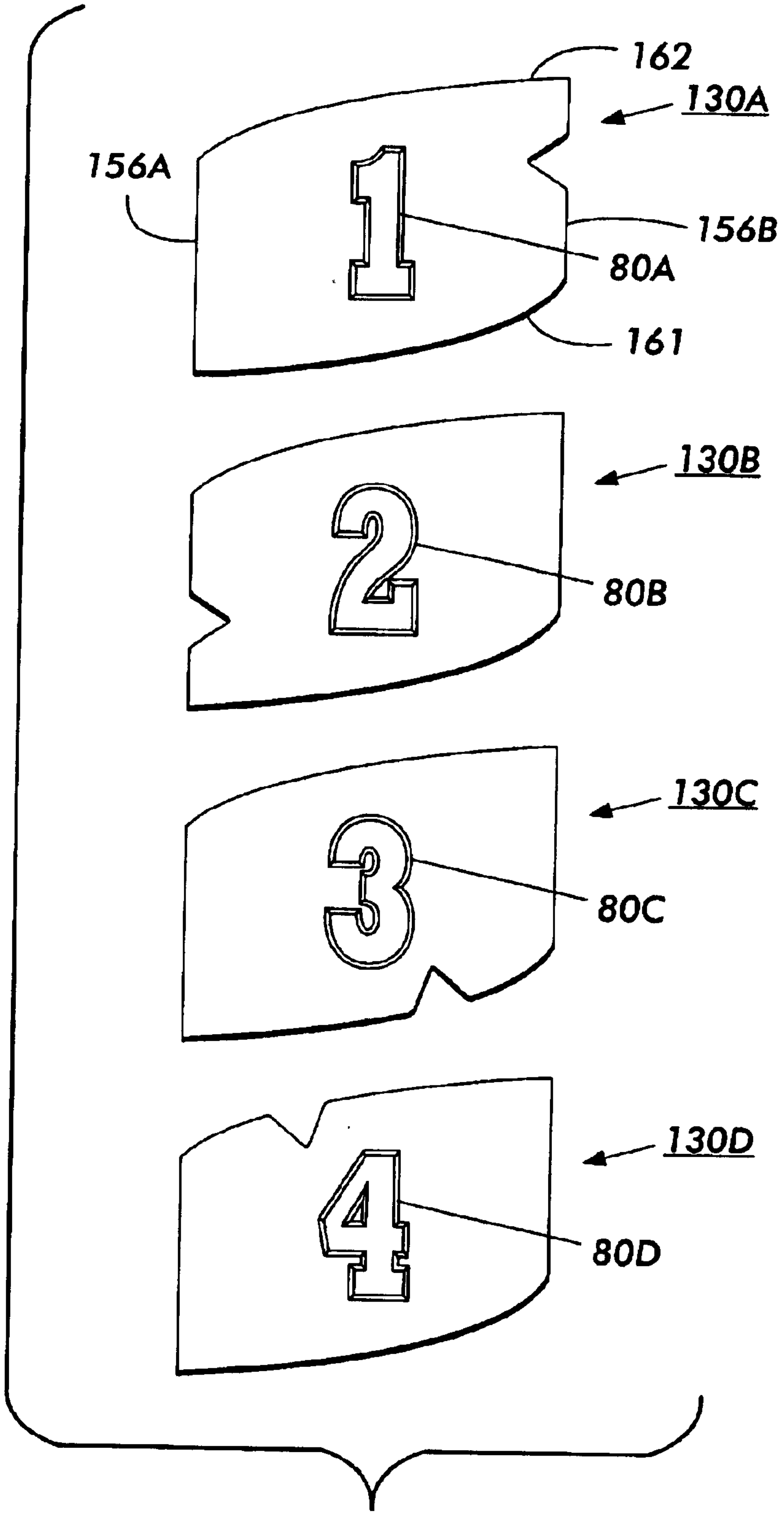
FIG. 14 is a top elevational view of another set of solid ink sticks.

As seen in FIG. 14, ink sticks can have shapes other than rectangular. The particular variation illustrated, each ink stick 130 has a pair of substantially flat lateral side surfaces 156 that curve into curved end surfaces 161, 162 to provide a "pillow" shape. In an alternative, the end surfaces could be substantially flat, with curved lateral side surfaces. Of course, the ink sticks can be formed in numerous other shapes with different numbers of side surfaces, and various combinations of curved and flat surfaces.

Those skilled in the art will recognize that corners and edges may have radii or other non-sharp configurations, depending on various factors, including manufacturing considerations. Those skilled in the art, upon reading this description will recognize that a variety of modifications may be made to the shapes of the ink sticks, including the shapes and configurations of the nesting elements, without departing from the spirit of the present invention. For example, different numbers of nesting elements can be included on the end surfaces of the ink sticks. The ink sticks can have non-cubic shapes. In certain circumstances, the nesting elements need not constrain vertical movement of the ink sticks relative one another. A substantial portion, or all, of the end surfaces of the ink sticks can be used to provide the nesting shapes for the ink sticks. In addition, the visually recognizable symbol can be any of a variety of shapes, such as animals, playing card symbols, model numbers, etc. Therefore, the following claims are not limited to the specific embodiments described and shown above.

I claim:

1. A set of ink sticks for use in a solid ink feed system of a phase change ink jet printer, the solid ink feed system having at least first, and second ink feed channels, wherein each feed channel is adapted to receive an ink stick inserted an insertion direction, the set of ink sticks comprising:

a first, second, and third ink sticks;

wherein each ink stick comprises a three dimensional ink stick body;

wherein each ink stick body has an insertion perimeter substantially perpendicular to the insertion direction;

wherein each ink stick body has common orientation feature to establish a unique insertion orientation for the ink stick insertion perimeter for insertion of the ink stick into a feed channel;

wherein each ink stick body has a lateral center of gravity between opposite sides of the insertion perimeter when the ink stick is in the insertion orientation;

wherein each ink stick body has one or more key elements along its insertion perimeter;

wherein each of the key elements is substantially identical in shape to the others of the key elements;

wherein each of the key elements is substantially identical in size to the others of the key elements;

wherein, when each ink stick is in its insertion orientation, the key element of the first ink stick is on a first side of the lateral center of gravity of the first ink stick, and the key element of the second ink stick is on a second side of the lateral center of gravity of the second ink stick, opposite the first side.

2. The set of ink sticks of claim 1, wherein the first and second key elements are inward projections along the insertion perimeter.

3. A set of ink sticks for use in a solid ink feed system of a phase change ink jet printer, the solid ink feed system having at least first, second, and third ink feed channels, wherein each feed channel is adapted to receive an ink stick inserted in an insertion direction, the set of ink sticks comprising:

first, second, and third ink sticks;

wherein each ink stick comprises a three dimensional ink stick body;

wherein each ink stick body has an insertion perimeter substantially perpendicular to the insertion direction;

wherein each ink stick body has a common orientation feature to establish a unique insertion orientation for the ink stick insertion perimeter for insertion of the ink stick into a feed channel;

wherein each ink stick body has a lateral center of gravity between opposite sides of the insertion perimeter when the ink stick is in the insertion orientation;

wherein each ink stick body has a key element along its insertion perimeter;

wherein a key element of each of the ink stick bodies has a first key element shape;

where the first key element shape for each ink stick body is substantially identical to the others in shape;

wherein a key element of each of the ink stick bodies has a first key element size;

wherein the first key element size for each ink stick body is substantially identical;

wherein, when each ink stick is in its insertion orientation, the key elements of the first and second ink sticks are each on a first side of the lateral center of gravity of the respective first and second ink stick, and the key element of the third ink stick is on a second side of the lateral center of gravity of the third ink stick, opposite the first side.

4. The set of ink sticks of claim 3, additionally comprising a fourth ink stick, wherein:

the fourth ink stick comprises a fourth three dimensional ink stick body;

the fourth ink stick body has an insertion perimeter substantially perpendicular to the insertion direction;

the fourth ink stick body has the common orientation feature to establish a unique insertion orientation for the ink stick insertion perimeter for insertion of the ink stick into a feed channel;

the fourth ink stick body has a lateral center of gravity between opposite sides of the insertion perimeter when the ink stick is in the insertion orientation;

the fourth ink stick body has a key element along its insertion perimeter;

the key element of the fourth ink stick body has the first key element shape substantially identical to the key element shape of the first, second, and third ink stick bodies;

the key element of the fourth ink stick body has the first key element size substantially identical to the key element size of the first, second, and third ink stick bodies;

when the fourth ink stick is in its insertion orientation, the key element of the fourth ink stick is on the second side of the lateral center of gravity of the third ink stick.

5. The set of ink sticks of claim 4, wherein the first, second, third, and fourth key elements are inward projections along the horizontal perimeter.

6. The set of ink sticks of claim 3, wherein when each stick is in its insertion orientation, the orientation feature of each stick is in a corresponding position.

7. The set of ink sticks of claim 3, wherein the first, second, and third key elements are inward projections along the perimeter.

8. A set of ink sticks for use in a solid ink feed system of a phase change ink jet printer, the solid ink feed system having at least first, second, third and fourth ink feed channels, wherein each feed channel is adapted to receive an ink stick inserted in an insertion direction, the set of ink sticks comprising:

a first ink stick having a first perimeter;

a second ink stick having a second perimeter;

a third ink stick having a third perimeter; and a fourth ink stick having a fourth perimeter;

wherein each of the first, second, third, and fourth perimeters has an orientation feature for identifying a unique ink stick insertion orientation for each of the ink sticks;

wherein the first perimeter of the first ink stick includes a first key element;

wherein the second perimeter of the second ink stick includes a second key element;

wherein the third perimeter of the third ink stick includes a third key element;

wherein the fourth perimeter of the fourth ink stick includes a fourth key element;

wherein the first, second, third, and fourth key elements are substantially identical to one another in shape;

wherein the first, second, third, and fourth key elements are substantially identical to one another in size;

wherein when each of the first, second, third, and fourth ink sticks is in its insertion orientation, the first, second, third, and fourth key elements are all in different relative positions on their respective ink stick perimeters.

9. The set of ink sticks of claim 8, wherein the orientation feature of each ink stick is adapted to interact with an orientation feature of the solid ink feed system.

10. The set of ink sticks of claim 9, wherein the orientation feature of each ink stick is substantially identical in size and shape.

11. The set of ink sticks of claim 10, wherein when each of the ink sticks is in its insertion orientation, the orientation feature of each ink stick is in the same relative position on their respective perimeters.

12. The set of ink sticks of claim 8, wherein:

each of the first, second, third, and fourth ink sticks has a lateral center between two opposed sides of the ink stick perimeter;

when each of the first, second, third, and fourth ink sticks is in its insertion orientation, the first and second key elements are on a first side of the lateral center, and the third and fourth key elements are on the opposite side of the lateral center.

13. The set of ink sticks of claim 8, wherein the first, second, third, and fourth key elements are inward projections along the horizontal perimeter.

14. A solid ink feed system comprising: a first ink feed channel; a first insertion opening for receiving an ink stick into the first ink feed channel, wherein the first insertion opening has a first key element along a first side of the insertion opening; a second ink feed channel; and a second insertion opening for receiving an ink stick into the second ink feed channel; a third ink feed channel; and a third insertion opening for receiving an ink stick into the third ink feed channel, wherein the third insertion opening has a third key element; wherein the second insertion opening is substantially parallel to the first insertion opening; wherein the third insertion opening is substantially parallel to the first and second insertion openings; wherein each of the first, second, and third insertion openings has corresponding first sides and second sides; wherein the first and second insertion openings have respective first and second key elements along the first side of each opening; wherein the third insertion opening has a third key element along a second side of the third insertion opening, opposite the first side; wherein the first, second, and third key elements are substantially identical in shape; and wherein the first, second, and third key elements are substantially identical in size.

15. The solid ink feed system of claim 14, additionally comprising:

a fourth ink feed channel; and a fourth insertion opening for receiving an ink stick into the fourth ink feed channel;

wherein the fourth insertion opening is substantially parallel to the first insertion opening; and wherein the fourth insertion opening has a fourth key element along the second side of the insertion opening.

16. The solid ink teed system of claim 15, additionally comprising an orientation feature on each of the insertion openings, wherein:

the orientation feature on each insertion opening is substantially identical in shape;

the orientation feature on each insertion opening is substantially identical in size; and the orientation feature an each insertion opening is substantially identical in relative position.

17. The solid ink feed system of claim 15, wherein the fourth key element is substantially identical to the first, second, and third key elements in shape and size.

* * * * *